United States Patent [19]

Hällberg

[11] Patent Number: 4,629,872
[45] Date of Patent: Dec. 16, 1986

[54] METHOD AND APPARATUS FOR VERIFYING PERSONAL IDENTIFICATION NUMBERS AND CHECKING STORED NUMBER SERIES IN IDENTIFICATION MEDIA

[75] Inventor: Björn I. C. Hällberg, Linköping, Sweden

[73] Assignee: Telefonaktiebolaget LM Ericsson, Stockholm, Sweden

[21] Appl. No.: 672,578

[22] Filed: Nov. 16, 1984

[30] Foreign Application Priority Data

Nov. 17, 1983 [SE] Sweden ................................ 8306349

[51] Int. Cl.⁴ ............................................. G06K 5/00
[52] U.S. Cl. ........................................ 235/380; 235/379
[58] Field of Search .................................. 235/379, 380

[56] References Cited

U.S. PATENT DOCUMENTS 4,312,672  3/1982  Braun ................................... 235/380

Primary Examiner—Harold I. Pitts
Attorney, Agent, or Firm—Roberts, Spiecens & Cohen

[57] ABSTRACT

A method and apparatus for verifying a personal identification number and checking a number series put onto an identification medium, containing information readable by machine in the form of a card and account number and permanent information in the form of a permanently inscribed number, include a first unit (2,4,22,24,6,8,10,12,14,16,18,20) for encryption of the card or account number (PAN) with an algorithm defined by a first key. The unit includes elements (6,8,10,12,14,16,18) for forming the first key of the personal identification number (PIN) in combination with a first key number (K1). The apparatus further contains a second unit (30,32,42,34,36,12,14,40,38) for generating a personal check number (PCN) by decryption of coded information obtained from the first unit with the aid of an algorithm defined by a second key. A third unit (44,46,48,70,66,68,80,82,64,76) is further adapted for encrypting the card or account number with the aid of the algorithm defined by the first key, and a fourth unit (44,48,52,24,70,72,74,82,64,88) is adapted for encrypting the personal check number with the aid of the algorithm defined by the second key. A comparison circuit (58), connected to the outputs from the third and fourth units, compares the coded card or account number and the coded personal check number for determining whether these numbers are in a predetermined relationship. The second and fourth units include elements (42,34,36,12,14,40,38; 72,74,82,64,88) for forming the second key from the permanent number (FN) in combination with a second key number (K2).

9 Claims, 4 Drawing Figures

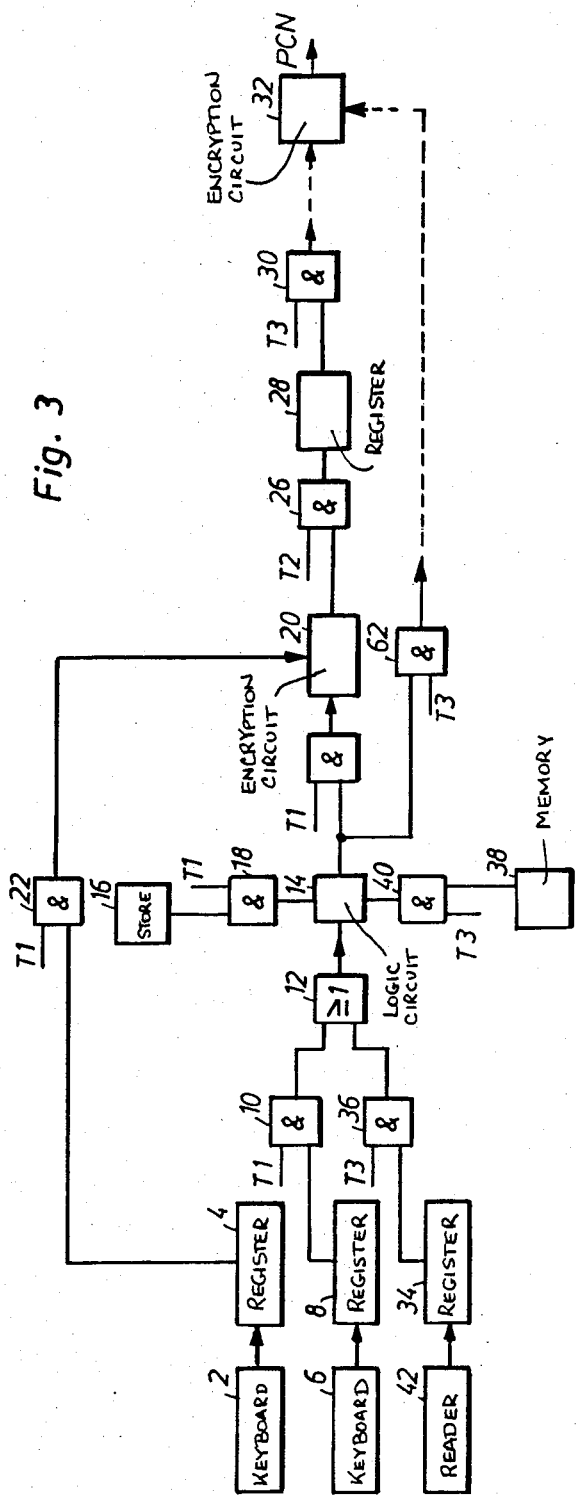

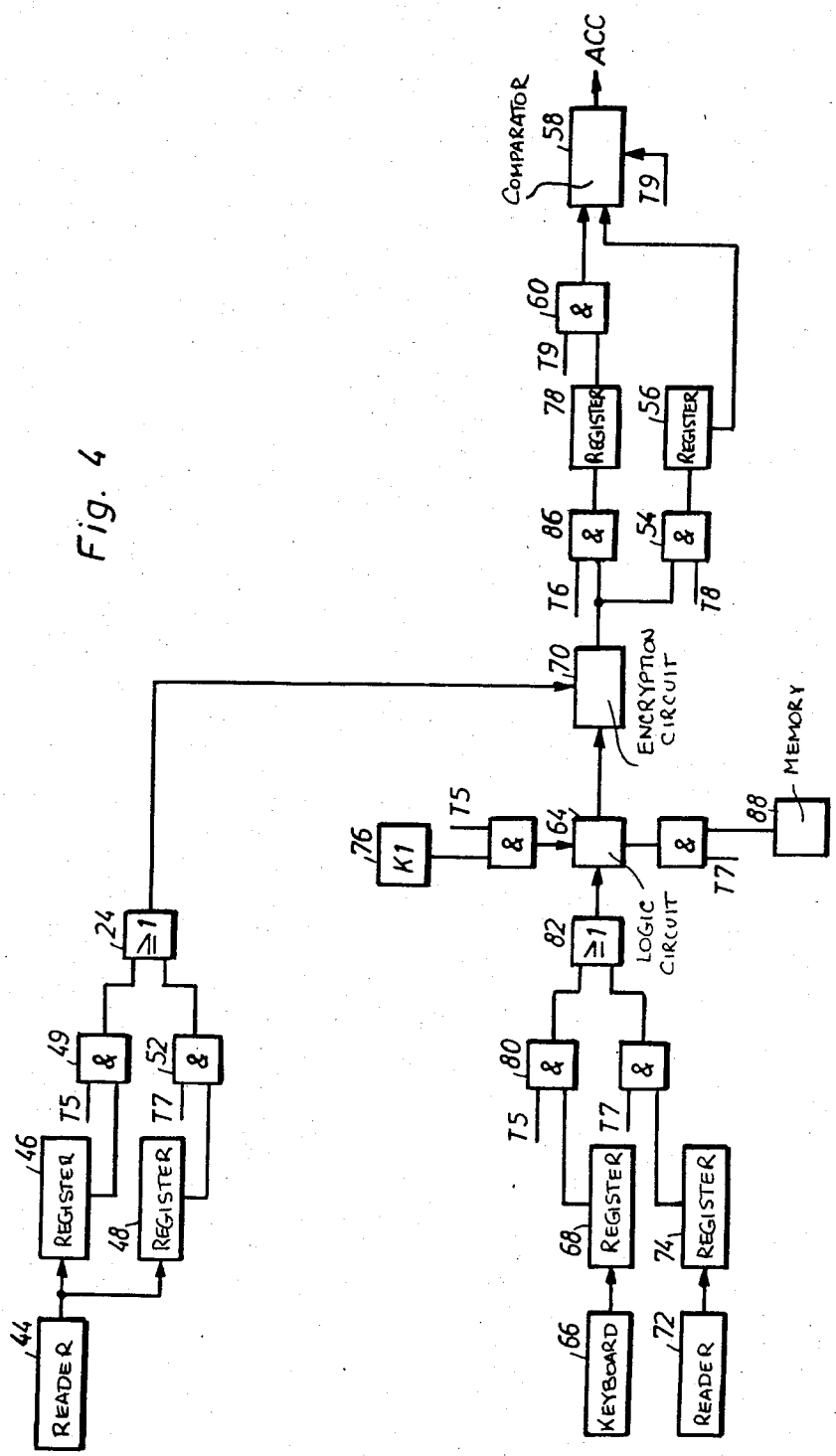

METHOD AND APPARATUS FOR VERIFYING PERSONAL IDENTIFICATION NUMBERS AND CHECKING STORED NUMBER SERIES IN IDENTIFICATION MEDIA

FIELD OF INVENTION

The present invention relates to a method and apparatus for verifying personal identification numbers and checking stored number series in identification media, containing information readable by machine in the form of a card or account number as well as permanent information in the form of a permanently stored number.

BACKGROUND

Identification media in the form of plastic cards often contain a magnetic strip which is magnetized with numeral values used in connection with personal identification. These values are combined with a personal code in a procedure for verifying that card and person are complementary. Such a procedure is described in the U.S. Pat. No. 4,214,230. However, the magnetic information on the magnetic strip can rather easily be changed by erasion and writing in new information. This may result in that a criminal organization can duplicate and manufacture such cards themselves.

So-called "secure cards" have been devloped and are now on the market, the term implying that the card contains permanent information which was put into it when it was produced, and this information can not be altered or put into a card produced by others not originally producing it, since this would require access to original production apparatus. At present this permanent number is used in connection with personal identification number (PIN) verification, such that the number is compared with a range of numbers allowable for the card number and if the permanent number is within this range, the check is considered to be approved.

SUMMARY OF THE INVENTION

This is not sufficient, however, since the variable information may be varied in spite of the permanent number being within the allowable area. Furthermore, the check can not be made if the PIN code verification system is placed in termials in an off-line system.

The object of the present invention is to mitigate these deficiencies and to achieve more secure personal identification method in a simple way.

This object is achieved with a method and apparatus of the kind disclosed in the introduction, and with the characterizing features disclosed in claims 1 and 3.

With the method and apparatus in accordance with the invention, the PIN code vertification and control of the permanent number is carried out in a simple way in one and the same procedure. With the inventive apparatus, security is thus increased considerably without the necessary identification apparatus being made notably more expensive. The invention is further implemented such that encryption algorithms have one-way properties, i.e. even if all secret information such as algorithm keys in the checking procedure is available, the permanent numbers in the identification media cannot be calculated. This is important in on-line systems where the card number and certain check numbers are centrally stored.

BRIEF DESCRIPTION OF DRAWINGS

An embodiment of the invention selected as an example will now be explained in detail in connection with the accompanying drawings in which FIG. 3 is a block diagram of an embodiment of the part of the inventive apparatus for generating a PCN and FIG. 4 is a block diagram of the portion of the inventive apparatus intended for PIN code vertification.

DETAILED DESCRIPTION OF A BEST MODE FOR CARRYING OUT THE INVENTION

Figure 1:
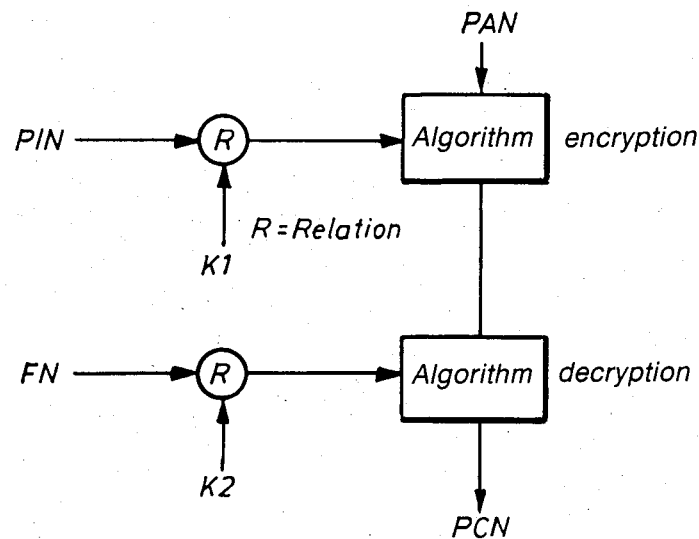
FIG. 1 illustrates a mehtod of generating a personal check number (PCN), FIG. 2. illustrates the PIN code vertification.

FIG. 1 illustrates a procedure describing the method of generating a PCN which, together with the personal card number or account number (PAN) may be registered in machine-readable code, on such as a magnetic strip, when the card is made. alternatively, the PCN may be stored in a central data file.

The procedure for PCN generation is divided into two encryption sections. In section 1 the PAN is encrypted with a relation of a secret key number K1 with the PIN as key to the algorithm. In section 2 there is subsequently a decryption of the above code by an algorithm with a relation between the permanent number FN and a secret key number K2 as the key to the algorithm. As previously mentioned above, the PCN value obtained is stored centrally or coded into the card in connection with issuing the card. The above procedure is carried out once per card in connection with issuing it.

On the other hand, the PIN code verification is carried out each time a card owner identifies himself at terminal level. This procedure is also divided into two sections, see FIG. 2.

Section 1 in the PIN code vertification procedure is exactly the same as section 1 in the PCN generation procedure, i.e. the PAN is algorithm encrypted with a relation between the secret key number K1 and the PIN as key.

In section 2 of the PIN code vertification the PCN is algorithm encrypted with the relation between the permanent number FN and the secret key number K2 as key.

The outputs from the two algorithms are compared, and if these are the same, then so is the identification, and the check of the FN is also approved.

As mentioned above, significant for both algorithms is that the relation between input and output vis-à-vis the key section of the algorithm is a one-way function.

The algorithm with the relation between the permanent number FN and the secret key number K2 as key must be reversible, as will be explained in detail below, although the other algorithm mentioned above does not need to be.

By the FN being included in the key section, the FN cannot be calculated for a greater number of cards even if the secret key numbers were known.

In FIG. 3 there is a block diagram of an example of the part of an apparatus in accordance with the invention, for carrying out the procedure described above for generating a personal check number PCN. From a keyboard 2, e.g. that of a bank teller, the account number PAN is fed to a register 4. The personal identification number PIN is fed into a register 8 via a customer keyboard 6. The FN is read into a register 34 by a reader 42.

At the time T1 the PIN is transferred via the AND gate 10 and OR gate 12 to a logical circuit 14, where it is combined with a key number K1 supplied to the logical circuit 14 from a store 16 through an AND gate 18. As a result of the combination of the PIN and K1 there is obtained on the output from the logical circuit 14 an algorithm key which is transferred to the encryption circuit 20.

The logical combination circuit 14 may comprise such as a modulo-two adder, and the store 16 can be a RAM store.

The PAN is simultaneously transferred from the register 4 via the AND gate 22 to the data input of the encryption circuit 20.

At the time T2 the output signal is transferred from the encryption circuit 20 through the AND gate 26 to a register 28, where data from the circuit 4 to the encryption circuit 20 is stored in encrypted form.

At the time T3 the content in the register 28 is transferred via the AND gate 30 to the data input of an encryption circuit 32 in the central computer (not more closely illustrated), this circuit being similar to the encryption circuit 20. The permanent number FN stored in a register 34 is simultaneously applied to the logical circuit 14 via an AND gate 36 and the OR gate 12, the permanent number being combined in the logical circuit with a secret key number K2, which is suitably stored in a RAM memory 38 and applied to the circuit 14 via the AND gate 40. The algorithm key thus obtained from the circuit 14 is changed in relation to the key used at the previous encryption in the circuit 20, so that when this key is fed to the key input of the circuit 32 it executes an inverted function compared with the circuit 20, i.e. it executes a decryption. The personal check number PCN is obtained from the output of the circuit 32 as a result of this process.

The PCN is coded into the card in connection with issuing the card, or is stored in a central data file.

Figure 2:
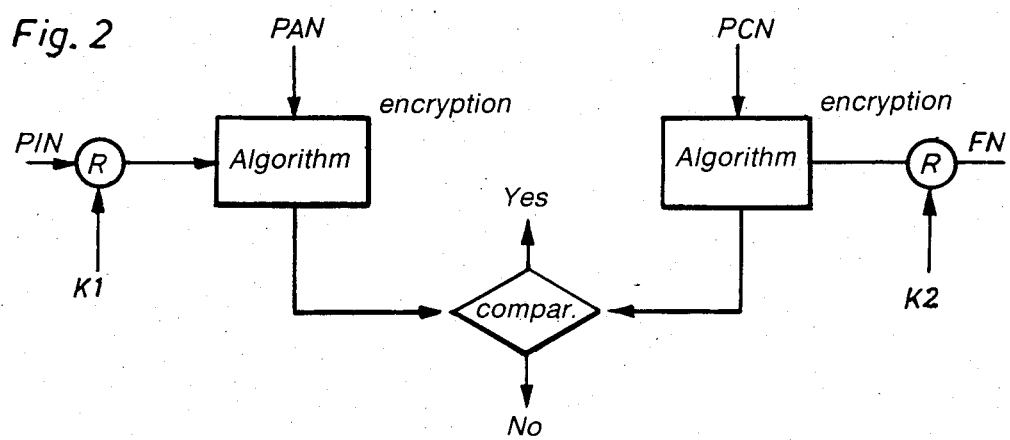

In FIG. 4 there is illustrated in a block diagram an example of the part of an apparatus in accordance with the invention, for carrying out the procedure for the PIN code vertification described in connection with FIG. 2.

In the PIN code verification which, as mentioned, is carried ot each time the card owner shall identify himself, the card owner or customer places his card in a reader 44 for reading in the PAN into a register 46, while the PCN is read into a register 48. Instead of reading the PCN from the card it may be obtained from a central data base file. The PIN is supplied to the register 68 via the customer keyboard 66 and the FN is read into the register 74 by the reader 72.

At the time T5 the PIN is transferred via an AND gate 80 and an OR gate 82 to the logical circuit 64 in a corresponding manner as has been described above in connection with the PCN generation. In the circuit 64 the PIN is combined with the key number K1 stored in the memory 76 to form an algorithm key to the encryption circuit 70. Simultaneously, the PAN is transferred from the register 46 via the AND gate 49 and the OR gate 24 to the data input of the encryption circuit 70. At the time T6 the coded information from the circuit 70 is stored in the register 78 via the AND gate 86.

At the time T7 the FN is transferred from the register 74 to the circuit 64 for combining with the key number K2 stored in the memory 88 to form an algorithm key for the circuit 70. Simultaneously the PCN is transferred from the register 48 via the AND gate 52 and the OR gate 24 to the data input of the encryption circuit 70. The code thus obtained from the encryption circuit 70 is transferred at the time T8 via the AND gate 54 to the register 56.

At the time T9 the contents in the registers 78 and 56 are compared in a comparator circuit 58, and if the content in the register 28 is the same as in the register 56 the card is accepted.

Of course, numerous variations of the example described are possible. For example, there may be a conversion circuit on the data input to the decryption circuit 32 in FIG. 3, for converting the code obtained from the register 28 to another code which is in a predetermined relationship to the first-mentioned code, as i described in the above mentioned U.S. Pat. No. 4,214,230. In such a case the comparison circuit 58 is implemented to accept the card if the contents in the two registers 28 and 56 are in the mentioned predetermined relationship to each other.

In a practical embodiment of the apparatus in accordance with the invention, it is of course possible that partially the same circuits and components are utilized for generating the PCN and the PIN code verification.

What is claimed is:

1. A method of verifying a personal identification number (PIN) and checking a number series put onto an idenfication medium, containing information readable by machine in the form of a card and account number (PAN) and permanent information in the form of a permanently inscribed number (FN), said method including encryption of the read card or account number with an algorithm defined by a first key, the first key being formed by a relation between the personal identification number (PIN) and first key number, encryption of a personal check number (PCN) with an algorithm defined by a second key, and comparison of the thus coded card or account number with the coded personal check number (PCN), characterized in that the second key is formed by a relation between the permanent number (FN) and a second key number (K2).

2. Method as claimed in claim 1, characterized in that the personal check number (PCN) is generated by the card and account number (PAN), which was encrypted with the algorithm defined by the first key, being decrypted with the algorithm defined by the second key to form the personal check number (PCN).

3. Apparatus for verifying a personal identification number (PIN) and checking a number series put into an identifying medium, containing stored information readable by machine in the form of a card or account number (PAN), and permanent information in the form of a permanently inscribed number (FN), said apparatus including a first unit (2,4,22,24,6,8,10,12,14,16,18,20) for encryption of the card or account number (PAN) with an algorithm defined by a first key, said unit including means (6,8,10,12,14,16,18) for forming the first key of the personal identification number (PIN) in combination with a first key number (K1), and a second unit (30,32,42,34,36,12,14,40,38) for generating a personal check number (PCN) by decryption of coded information obtained from the first unit with the aid of an algorithm defined by a second key, a third unit (44,46,48,70,66,68,80,82,64,76) for encryption of the card or account number with the aid of the algorithm defined by the first key, a fourth unit (44,48,52,24,70,72,74,82,64,88) for encryption of the personal check number (PCN) with the aid of the algorithm defined by the second key, and a comparison circuit (58) connected to the outputs from the third and fourth units, for comparing the coded card or account number (PAN) and the coded personal check number (PCN) and determination as to whether these are in a predetermined relationship, characterized in that the second and fourth units include means for forming the second key from the permanent number (FN) in combination with a second key number (K2).

4. Apparatus as claimed in claim 3, characterized in that said encryption units are made with algorithms having one-way properties.

5. Apparatus as claimed in claim 3 or 4, characterized in that the first unit includes means for supplying, at a given time, a card or account number to the data input of an encryption circuit.

6. Apparatus as claimed in claim 3, characterized in that the the second unit includes means for supplying, at a given time, coded information obtained from the first unit to the data input of a decryption circuit.

7. Apparatus as claimed in claim 3, characterized in that the third unit includes means for supplying, at a given time, a card or account number to the data input of an encryption circuit.

8. Apparatus as claimed in claim 3, characterized in that the third unit includes means similar to those of the first unit for forming the first algorithm key.

9. Apparatus as claimed in any of claim 3, characterized in that the fourth unit contains means for supplying, at a given time, the personal check number to the data input of the encryption circuit.

* * * * *